US006108184A

United States Patent [19]

Minervini et al.

[11] Patent Number: 6,108,184

[45] Date of Patent: Aug. 22, 2000

[54] SURFACE MOUNTABLE ELECTRICAL DEVICE COMPRISING A VOLTAGE VARIABLE MATERIAL

[75] Inventors: Anthony D. Minervini, Orland Park; Luciano Honorio, Elk Grove Village, both of Ill.

[73] Assignee: Littlefuse, Inc., Des Plaines, Ill.

[21] Appl. No.: 09/191,597

[22] Filed: Nov. 13, 1998

[51] Int. Cl.[7] .......... H02H 3/22

[52] U.S. Cl. .......... 361/111; 361/126; 361/127; 338/21

[58] Field of Search .......... 361/91.1, 117–118, 361/56, 111, 124, 126–127; 338/21, 22 R

[56] References Cited

U.S. PATENT DOCUMENTS 4,157,527 6/1979 Philipp .......... 338/21

*Primary Examiner*—Michael J. Sherry
*Attorney, Agent, or Firm*—Hill & Simpson

[57] ABSTRACT

The surface mountable electrical device provides utilizes polymer composite materials to protect electronic components against electrical overstress transients. The device includes a first substrate having an electrode formed thereon. A portion of the electrode forms an electrical connector which projects outwardly from the substrate. A second substrate has a electrode formed on a surface thereof. A portion of the electrode on the second substrate forms a well or cavity. A voltage variable material is disposed within the cavity formed in the electrode on the second substrate. The two substrates are laminated together such that the electrical connector extends into the voltage variable material disposed within the cavity. Outer terminations adapted to be connected to an electrical circuit are formed on the outer surfaces of the substrates and are electrically connected to each respective electrode.

21 Claims, 2 Drawing Sheets

FIG. 1
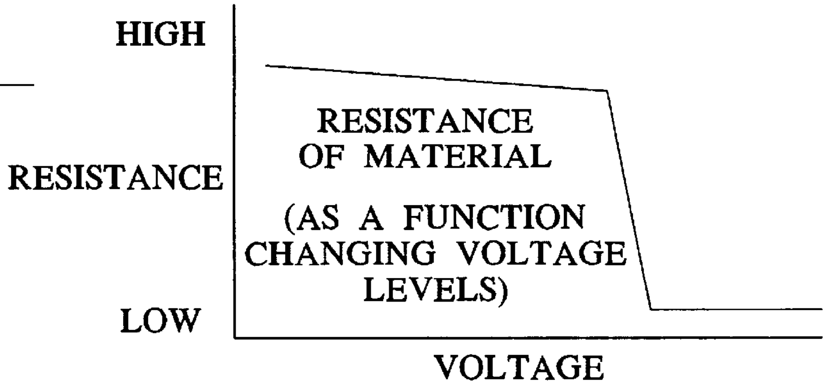
FIG. 2
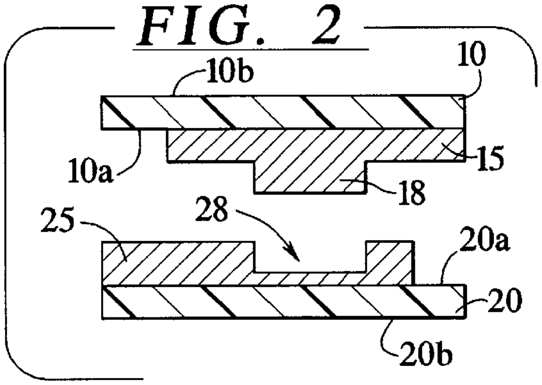
FIG. 3
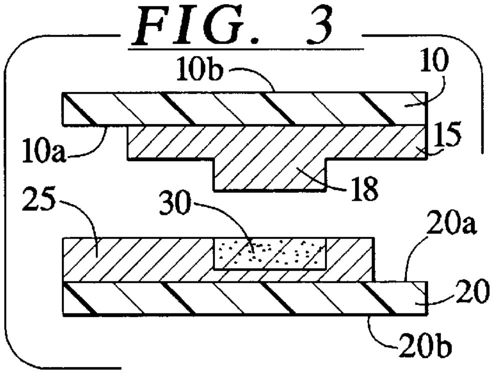
FIG. 4
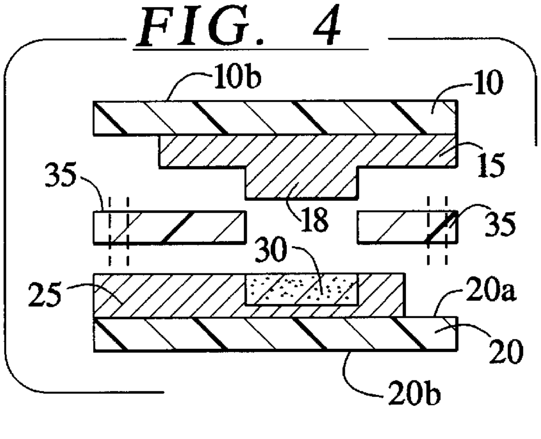
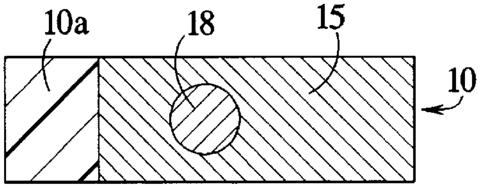
FIG. 3A
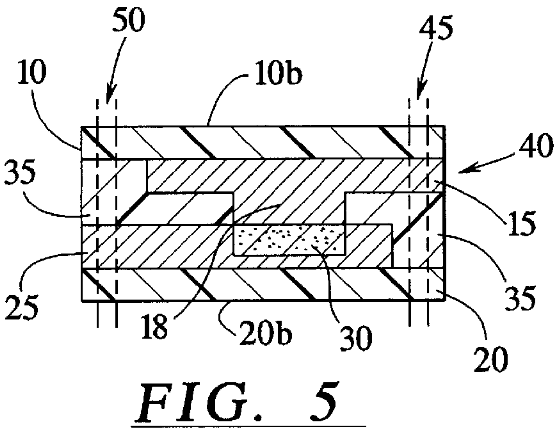
FIG. 5
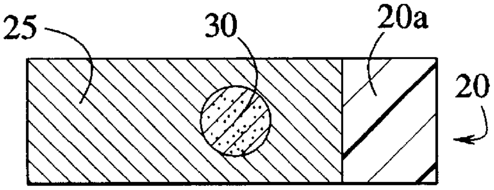
FIG. 3B

SURFACE MOUNTABLE ELECTRICAL DEVICE COMPRISING A VOLTAGE VARIABLE MATERIAL

TECHNICAL FIELD

The present invention relates generally to a surface mountable electrical circuit protection device. More particularly, the present invention relates to surface mountable devices which utilize polymer composite materials for the protection of electronic components against electrical overstress (EOS) transients.

BACKGROUND OF THE INVENTION

There is an increased demand for electrical components which can protect electronic circuits from EOS transients which produce high electric fields and usually high peak powers capable of destroying circuits or the highly sensitive electrical components in the circuits, rendering the circuits and the components non-functional, either temporarily or permanently. The EOS transient can include transient voltage or current conditions capable of interrupting circuit operation or destroying the circuit outright. Particularly, EOS transients may arise, for example, from an electromagnetic pulse, an electrostatic discharge, lightening, or be induced by the operation of other electronic or electrical components. Such transients may rise to their maximum amplitudes in microsecond to subnanosecond time frame and may be repetitive in nature.

Materials for the protection against EOS transients (EOS materials) are designed to respond essentially instantaneously (i.e., ideally before the transient wave reaches its peak) to reduce the transmitted voltage to a much lower value and clamp the voltage at the lower value for the duration of the EOS transient. EOS materials are characterized by high electrical resistance values at low or normal operating voltages and currents. In response to an EOS transient, the material switches essentially instantaneously to a low electrical resistance value. That is, EOS materials have a non-linear resistance as a function of voltage. When the EOS threat has been mitigated these materials return to their high resistance value. These materials are capable of repeated switching between the high and low resistance states, allowing circuit protection against multiple EOS events. EOS materials are also capable of recovering essentially instantaneously to their original high resistance value upon termination of the EOS transient. For purposes of this application materials which exhibit a non-linear resistance as a function of voltage will be referred to as "voltage variable" materials FIG. 1 illustrates a typical electrical resistance versus d.c. voltage relationship for EOS materials. Circuit components including EOS materials can shunt a portion of the excessive voltage or current due to the EOS transient to ground, thus, protecting the electrical circuit and its components. The major portion of the threat transient is reflected back towards the source of the threat. The reflected wave is either attenuated by the source, radiated away, or re-directed back to the surge protection device which responds with each return pulse until the threat energy is reduced to safe levels.

Typical EOS materials comprise a polymeric binder with conductive, semiconductive and insulative particles dispersed therein. Examples of prior EOS polymer composite materials are also disclosed in U.S. Pat. Nos. 4,331,948, 4,726,991, 4,977,357, 4,992,333, 5,142,263, 5,189,387, 5,294,374, 5,476,714, 5,669,381, and 5,781,395.

In a typical prior application of polymeric EOS materials, the material is placed in a gap formed by two confronting electrodes disposed on a supporting substrate. The edges of the electrodes form the active electrode area. An example of such an edge-to-edge electrode configuration is disclosed in International Publication Number WO 97/26665. This edge-to-edge electrode configuration has several drawbacks. First, while the overall electrode may occupy a relatively large planar area, the active area of the electrode (i.e., the portion of the electrode in contact with the EOS material) is relatively small. Moreover, in order to obtain the proper clamping voltages for certain applications the gap between the edges of the electrodes must be extremely narrow, e.g., two (2) mils. It is often difficult to control the manufacturing process to (1) form such a precise, narrow gap and (2) deposit the EOS material in such a small space. The present invention is provided to solve these and other problems.

SUMMARY OF THE INVENTION

The present invention is a surface mountable electrical circuit protection device with an increased active electrode area between which a voltage variable material is electrically connected. A well or cavity is formed in a first electrode. A voltage variable material is disposed within the cavity. A second electrode has an electrical connector which extends into the voltage variable material. Rather than an edge-to-edge electrode configuration, the device of the present invention utilizes the larger flat surface areas of the electrodes to make an electrical connection to a voltage variable material. The cavity or well design of the electrode makes the device especially well suited for processing of polymeric EOS materials.

In one embodiment of the present invention there is provided an electrical circuit protection device comprising a first electrode formed from a conductive material and having a cavity formed therein. A voltage variable material is disposed within the cavity. A second electrode is formed from a conductive material and is electrically connected to the voltage variable material. The device allows for larger, flat surface areas of the electrodes to be electrically connected by the voltage variable material. When compared to edge-to-edge electrode configurations occupying the same planar area, devices of the present invention can achieve lower clamping voltages and inductances.

In another embodiment of the present invention there is provided an electrical circuit protection device comprising a first substrate having a first electrode formed on a first surface thereof. The first electrode has a well or cavity formed therein. A voltage variable material is disposed within the cavity. A second substrate has a second electrode formed on a first surface thereof. The second electrode has an electrical connector in direct contact with the voltage variable material. Preferably, the electrical connector extends into the voltage variable material in the cavity. A first outer termination is electrically connected to the first electrode and a second outer termination is electrically connected to the second electrode.

In yet another embodiment of the present invention there is provided a surface mountable electrical circuit protection device comprising a first electrically insulating substrate having a first and a second surface. A first electrode is formed on the first surface of the first substrate. The first electrode has material removed to form a cavity therein. A voltage variable material is disposed within the cavity. A second electrically insulating substrate has a first and a second surface. A second electrode is formed on the first surface of the second substrate. The second electrode has an electrical connector which projects outwardly from the first surface of the second substrate and is in direct contact with the voltage variable material. An insulating layer is disposed between the first and the second substrates, separating the first electrode from the second electrode. The first and the second electrodes are electrically connected by the voltage variable material. A first end termination is formed on the first and second substrates and is electrically connected to the first electrode. A second end termination is formed on the first and second substrates and is electrically connected to the second electrode.

In a final embodiment of the present invention there is provided an electrical circuit protection device comprising an electrically insulating substrate having a first and a second surface. A conductive layer is formed on the first surface of the substrate. A portion of the conductive layer is removed to form first and second electrodes separated by a gap. An insulating layer is disposed on the conductive layer and has material removed to form a cavity adjacent the gap in the conductive layer. A voltage variable material is disposed in the cavity and the gap and electrically connects the first and the second electrodes.

BRIEF DESCRIPTION OF THE DRAWINGS

A better understanding of the present invention will be had upon reference to the following detailed description and accompanying drawings. The size and thickness of the various elements illustrated in the drawings has been greatly exaggerated to more clearly show the electrical devices of the present invention.

FIG. 1 graphically illustrates the electrical resistance versus d.c. voltage relationship of typical EOS materials.

FIG. 2 is a partial exploded cross-sectional view of an electrical device according to one embodiment of the present invention.

FIG. 3 illustrates the partial exploded cross-sectional view of FIG. 2 with voltage variable material disposed in the cavity of one electrode.

FIGS. 3A and 3B illustrate a bottom view of the first substrate and a top view of the second substrate, respectively.

FIG. 4 is a partial exploded cross-sectional view of an electrical device according to one embodiment of the present invention.

FIG. 5 is a cross-sectional view of a laminate prior to formation of the outer terminations.

DETAILED DESCRIPTION OF THE INVENTION

Figure 6:
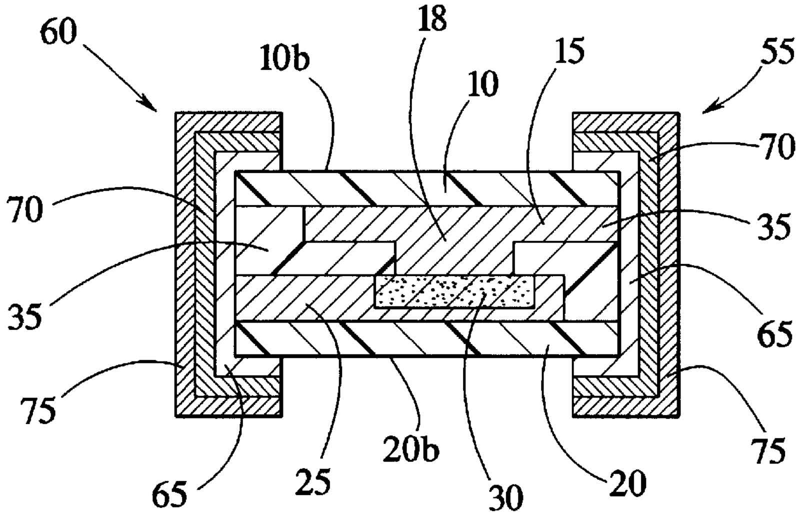
FIG. 6 is a cross-sectional view of an electrical device according to one embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention. For example, the process for manufacturing the devices according to the present invention will be explained below with reference to only a single device. However, the present invention is designed to be carried out on panels approximately 7.5 inches by 7.5 inches. In this manner, a plurality of electrical circuit protection devices can be manufactured with relative ease.

Referring to FIG. 2, there is illustrated a partial exploded cross-sectional view of a device according to one embodiment of the present invention. The partial device includes opposing electrically insulating substrates 10, 20. Each substrate 10, 20 has a first surface 10*a*, 20*a*, respectively, and a second surface 10*b*, 20*b*, respectively. Disposed on the first surface 10*a* of the first substrate 10 is a first electrode 15. Disposed on the first surface 20*a* of the second substrate 20 is a second electrode 25. The first electrode 15 has an electrical connector 18 which projects outwardly from the first surface 10*a* of the first substrate 10. The second electrode 25 has material removed to form a well or cavity 28. As shown in FIG. 3, a voltage variable material 30 is disposed within the cavity 28 formed in the second electrode 25.

The electrodes 15, 25 are applied to the surfaces 15*a*, 20*a* of the substrates 10, 20 using a conventional photo lithographic/electrolytic deposition process. In order ensure a good connection between the electrodes 15, 25 and the substrates 10, 20, the substrates 10, 20 are first cleaned. Preferred materials for use as the supporting substrates 10, 20 are FR-4 epoxy, polyimide and ceramic. FR-4 epoxy cured to C-stage is especially preferred.

A photo resist material is applied to the surfaces 15*a*, 20*a* of the substrates 10, 20. A stencil or mask is applied to the photo resist material and the unmasked material is cured or developed. The photo resist material covering the portion of the surface 15*a*, 20*a* to receive the electrodes (i.e., the uncured material) is stripped and rinsed away. The electrodes 15, 25 are then applied to the inner, exposed surfaces 10*a*, 20*a* of the substrates. Preferably copper is applied to the surfaces 15*a*, 20*a* via electrolytic deposition. It should be understood, however, that a number of conductive materials can be used to form the electrodes 15, 25, e.g., silver, nickel, aluminum, platinum, gold, zinc and alloys thereof. After the electrodes 15, 25 are applied to the substrates 10, 20, the remaining cured photo resist material is removed by exposing the material to a chemical bath.

In the next step, the electrical connector 18 portion of the first electrode 15 and the cavity 28 in the second electrode 25 is formed. Again conventional photo lithographic and electrolytic deposition processes are used. A photo resist material and a stencil is applied to the first and second electrodes 15, 25 to form the electrical connector 18 and the well or cavity 28. The photo resist material covering the area of the first electrode 15 which will not form the electrical connector 18 is cured. The uncured material covering the area of the first electrode 15 to be "built up" to form the electrical connector 18 is stripped and rinsed away. A conductive layer is electrolytically deposited on the exposed surface area of the first electrode 15. Preferably, the material used to form the electrical connector 18 is the same material as used to form the first electrode 15 (e.g., copper). After the electrical connector 18 is formed, the remaining cured photo resist material is exposed to a chemical bath and removed from the first electrode 15.

The photo resist material covering the area of the second electrode 25 which will ultimately form the well or cavity 28 is cured. The uncured photo resist material covering the area of the second electrode 25 to be "built up," thus forming a well or cavity 28 in the second electrode 25 is stripped and rinsed away. A conductive layer is electrolytically deposited on the exposed surface area of the second electrode 25. Preferably, the material used to "build up" the second electrode and form the well or cavity 28 is the same material as used to form the second electrode 25 (e.g., copper). After the well or cavity 28 is formed, the remaining cured photo resist material is exposed to a chemical bath and removed from the second electrode 25.

The electrical connector 18 and the well or cavity 28 should have a similar geometric configuration and similar dimensions so that the electrical connector 18 can be inserted into the voltage variable material 30 when it is placed in the well or cavity 28. For example, both the electrical connector 18 and the well or cavity 28 can have a circular or a square shaped cross section. The bottom view of the first substrate 10 illustrated in FIG. 3A illustrates a columnar-shaped electrical connector 18. The top view of second substrate 20 illustrated in FIG. 3B illustrates a corresponding circular-shaped cavity 28 having a voltage variable material 30 placed therein.

A voltage variable material 30 is disposed in the well or cavity 28. In a preferred embodiment, a polymeric EOS material is pressed into the well or cavity 28 and the excess material is scraped away.

Next, with reference to FIG. 4, an insulating layer 35 is disposed between the first and second substrates 10, 20 to physically separate the first and second electrodes 15, 25 and to isolate the electrodes 15, 25 so that an electrical connection is made only to one of the two outer terminations, as will be described below. A preferred material for use in the insulating layer 35 is a B-stage FR-4 epoxy. In order to facilitate production of devices on a large scale, it is preferred that the insulating layer 35 have pre-drilled or punched through holes. The through holes, represented by dotted lines in FIGS. 4 and 5, also help in the formation of the outer terminations as will be described below.

The subassembly illustrated in FIG. 4 is placed in a heated press to form a laminate 40 (illustrated in FIG. 5). As shown in FIG. 5, during this lamination process the insulating layer 35 physically contacts and bonds to the exposed inner surfaces 10*a*, 20*a* of the substrates 10, 20, respectively. The insulating layer 35 also electrically insulates the electrodes 15, 25 at opposite ends of the device. That is, the first electrode 15 is left exposed at a first end of the device (but is electrically insulated at the second end) to make an electrical and mechanical connection with a first outer termination. In a similar manner, the second electrode is left exposed at the second end of the device (but is electrically insulated at the first end) to make an electrical and mechanical connection with a second outer termination.

Holes 45, 50 (aligned with the pre-drilled through holes in the insulating layer 35) are drilled through the laminate 40 at opposite ends. The entire outer surface of the laminate 40, as well as the inner surfaces of the through holes 45, 50, is metallized or plated with a first conductive layer 65. Preferably the first conductive layer 65 comprises electroless plated copper.

In a preferred embodiment, a second 70 and third 75 conductive layer is applied to the first conductive layer 65. Preferably, the second conductive layer 70 comprises nickel and the third conductive layer 75 comprises a mixture of tin and lead. Finally, first and second outer terminations 55, 60 are formed using conventional photo lithographic and etching processes. The entire outer surface is covered with a photo resist material. A stencil or mask is placed over the photo resist material adjacent the outer surfaces 10*b*, 20*b* of the substrates 10, 20. The unmasked material is cured. The uncured material is stripped and rinsed away exposing the third conductive layer 75 in the desired areas. The first 65, second 70 and third 75 conductive layers are etched away using a ferric chloride solution to expose the outer surfaces 10*b*, 20*b* of the substrates 10, 20 and form the outer terminations 55, 60. The remaining cured photo resist material covering the outer terminations 55, 60 is exposed to a chemical bath and removed.

In a final dicing operation, the panels are separated into individual devices. A diamond saw or the like is used to cut the panels along parallel lines through the through holes 45, 50. Thus, in a preferred embodiment, the outer terminations 55, 60 have a castellated (i.e., semi-circular notches) configuration.

The cross-section of a preferred device according to the present invention is shown in FIG. 6. The device has first and second outer terminations 55, 60 which wrap around opposite ends of the device. The first outer termination 55 is in physical and electrical contact with the first electrode 15. The second outer termination 60 is in physical and electrical contact with the second electrode 25. The device can be mounted to a PC board by either side since the wrap around outer terminations make the device symmetrical. This especially important for smaller devices where orientation on a PC board is often difficult.

Figure 7:
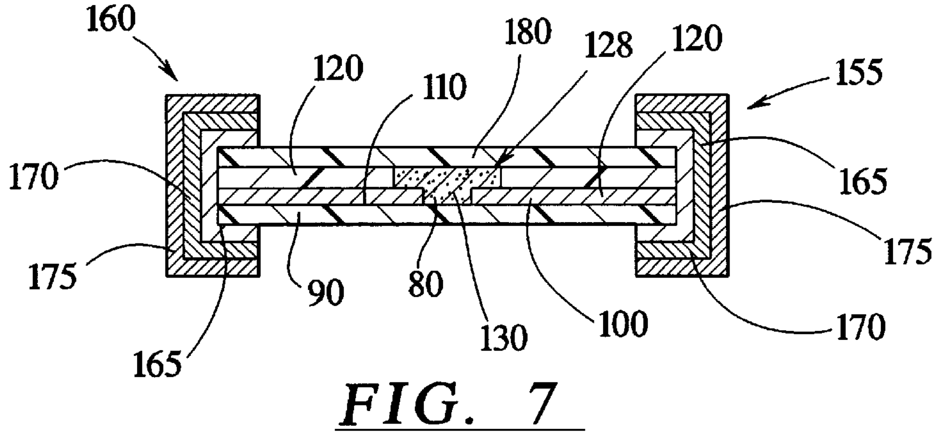
FIG. 7 is a cross-sectional view of an electrical device according to another embodiment of the present invention.

In another embodiment of the present invention illustrated in FIG. 7, a gap 80 is formed in a first conductive layer formed on an electrically insulating supporting substrate 90 to form first and second electrodes 100, 110. An insulating layer 120 is disposed on the conductive layer and has material removed adjacent to the gap 80 to form a well or cavity 128. A voltage variable material 130 is disposed in the gap 80 and the cavity 128, and electrically connects the first electrode 100 to the second electrode 110. First and second outer terminations 155, 160 are electrically and physically connected to the first and second electrodes 100, 110, respectively. The outer terminations are adapted to be connected to an electrical circuit. As such, in a preferred embodiment, the outer terminations are comprised of a first conductive layer 165. A second conductive layer 170 is disposed on the first conductive layer 165 and a third conductive layer 175 is disposed on the second conductive layer 170. The conductive layers are preferably comprised of the conductive materials discussed above.

In the preferred embodiment illustrated in FIG. 7, a protective layer 180 is disposed on the insulating layer 120 and covers the voltage variable material 130. In this preferred embodiment, the first outer termination 155 is disposed on the protective layer 180 and the substrate 90, wrapping around the end of each. The first outer termination 155 is also physically and electrically connected to the first electrode 100. The second outer termination 160 is disposed on the protective layer 180 and the substrate 90, wrapping around the end of each. The second outer termination 160 is also physically and electrically connected to the second electrode 110. The electrically insulating supporting substrate 90, the insulating layer 120 and the protective layer 180 are all preferably formed from FR-4 epoxy.

Figure 8:
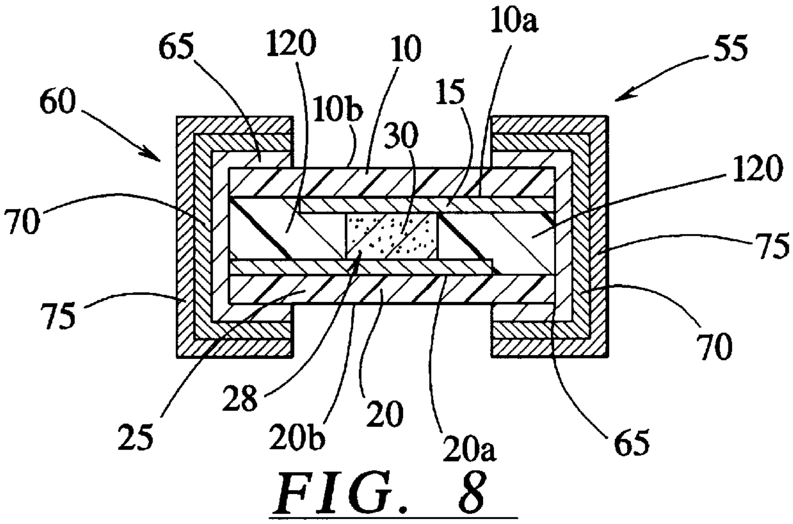
FIG. 8 is a cross-sectional view of an electrical device according to another embodiment of the present invention.

With reference now to FIG. 8, there is disclosed another preferred embodiment of an electrical device according to the present invention. The device includes first and second support substrates 10, 20 having first and second electrodes 15, 25 formed on surfaces 10*a*, 20*a* thereof. Rather than forming a cavity or a gap in the electrodes, the insulating layer 120 is interposed between the first and second electrodes 15, 25 and has material removed to form a cavity 28. The insulating layer 120 physically and electrically separates the first electrode 15 from the second electrode 25. The voltage variable material 30 is disposed within the cavity 28 and electrically connects the first electrode 15 to the second electrode 25. Optionally, either the first 15 or second electrode 25 may include an electrical connector (not shown) which extends into the voltage variable material 30.

In the preferred embodiment illustrated in FIG. 8, the electrodes 15, 25 are offset from opposite ends of the support substrates 10, 20, respectively. This offset configuration permits the first outer terminations 55, which wraps around the first end of the device and is disposed on both the first and second support substrates 10, 20, to make an electrical connection with the first electrode 15, but not the second electrode 25. Similarly, this offset electrode configuration permits the second outer termination 60, which wraps around the second end of the device and is disposed on both the first and second support substrates 10, 20, to make an electrical connection with the second electrode 25, but not the first electrode 15. As mentioned above, the outer terminations are preferably comprised of first 65, second 70 and third 75 conductive layers.

What is claimed is:

1. An electrical circuit protection device comprising:

a first electrode formed from a conductive material and having a cavity formed therein;

a voltage variable material disposed within said cavity of said first conductive electrode; and a second electrode formed from a conductive material and electrically connected to said voltage variable material, wherein the first and second electrodes are formed on respective support substrates.

2. The electrical device of claim 1, wherein the respective support substrates include a pair of outer terminations adapted for connection to an electrical circuit, the outer terminations being electrically connected to the first and second electrodes, respectively.

3. The electrical device of claim 1, wherein the first and second electrodes are formed from a metal selected from the group including copper, silver, nickel, aluminum, platinum, gold, zinc and alloys thereof.

4. The electrical device of claim 1, wherein the second electrode extends into the voltage variable material.

5. The electrical device of claim 1, wherein the support substrates are formed from an electrically insulating material selected from the group including FR-4 epoxy, polyimide, and ceramic.

6. An electrical circuit protection device comprising:

a first substrate having a first electrode formed on a first surface thereof, the first electrode having a cavity formed therein;

a voltage variable material disposed within the cavity;

a second substrate having a second electrode formed on a first surface thereof, the second electrode making electrical contact with the voltage variable material;

a first outer termination electrically connected to the first electrode; and a second outer termination electrically connected to the second electrode.

7. The electrical device of claim 6 further comprising an insulating layer disposed between the first and second substrates, the insulating layer physically separating the first electrode from the second electrode.

8. The electrical device of claim 7, wherein the insulating layer has a gap formed therein and the second electrode extends through the gap in the insulating layer to make direct contact with the voltage variable material.

9. The electrical device of claim 6, wherein the device has a first end and a second end, the first outer termination wrapping around the first end of the device and the second outer termination wrapping around the second end of the device.

10. The electrical device of claim 6, wherein the outer terminations are comprised of first and second conductive layers, the second conductive layer being formed on the first conductive layer.

11. The electrical device of claim 10, wherein the first conductive layer is comprised of copper.

12. The electrical device of claim 10, wherein the second conductive layer is comprised of nickel.

13. The electrical device of claim 10, wherein the outer terminations include a third conductive layer formed on the second conductive layer, the third conductive layer comprising a mixture of tin and lead.

14. A surface mountable electrical circuit protection device comprising:

a first electrically insulating substrate having a first and a second surface;

a first electrode formed on the first surface of the first substrate, the first electrode having a cavity formed therein;

a voltage variable material disposed within the cavity;

a second electrically insulating substrate having a first and a second surface;

a second electrode formed on the first surface of the second substrate, the second electrode having an electrical connector which projects outwardly from the first surface of the second substrate and is in direct contact with the voltage variable material;

an insulating layer disposed between the first and second substrates and separating the first electrode from the second electrode, the first and second electrodes being electrically connected by the voltage variable material;

a first outer termination formed on the second surface of the first substrate and on the second surface of the second substrate, the first end termination electrically connected to the first electrode; and a second outer termination formed on the second surface of the first substrate and on the second surface of the second substrate, the second end termination electrically connected to the second electrode.

15. An electrical circuit protection device comprising:

an electrically insulating substrate having first and second surfaces and first and second ends;

a conductive layer formed on the first surface of the substrate, the conductive layer having a gap formed therein to form first and second electrodes;

an insulating layer disposed on the conductive layer, the insulating layer having a cavity formed therein adjacent the gap in the conductive layer; and a voltage variable material disposed in the cavity and the gap, the voltage variable material electrically connecting the first and the second electrodes.

16. The electrical device of claim 15, wherein the first and second electrodes are electrically connected to outer terminations which are adapted to be connected to an electrical circuit.

17. The electrical device of claim 15 further comprising a protective layer disposed on the insulating layer and covering the voltage variable material.

18. The electrical device of claim 17 comprising:

a first outer termination disposed on the protective layer and wrapping around the first end of the insulating substrate, the first outer termination electrically connected to the first electrode; and a second outer termination disposed on the protective layer and wrapping around the second end of the insulating substrate, the second outer termination electrically connected to the second electrode.

19. The electrical device of claim 17, wherein the electrically insulating substrate, the insulating layer, and the protective layer are formed from FR-4 epoxy.

20. An electrical circuit protection device comprising:

a first electrode disposed on a first support substrate and a second electrode disposed on a second support substrate;

an insulative layer interposed between the first and second electrodes, the insulative layer having a cavity formed therein; and a voltage variable material disposed in the cavity and electrically connecting the first electrode to the second electrode.

21. The electrical device of claim 20 including a first outer termination disposed on the first and second support substrates and electrically connected to the first electrode, and a second outer termination disposed on the first and second support substrates and electrically connected to the second electrode.

* * * * *